United States Patent [19]

Schuster

[11] 4,432,873

[45] Feb. 21, 1984

[54] HIGH GRADIENT MAGNETIC SEPARATION DEVICE

[75] Inventor: Karl Schuster, Marloffstein/Adlitz, Fed. Rep. of Germany

[73] Assignee: Siemens Aktiengesellschaft, Berlin and Munich, Fed. Rep. of Germany

[21] Appl. No.: 310,323

[22] Filed: Oct. 9, 1981

[30] Foreign Application Priority Data

Oct. 16, 1980 [DE] Fed. Rep. of Germany ....... 3039171

[51] Int. Cl.$^3$ ............................................... B01D 35/06

[52] U.S. Cl. ....................................... 210/223; 210/499

[58] Field of Search ................ 210/222, 223, 231, 499

[56] References Cited

U.S. PATENT DOCUMENTS

| | | | |
|---|---|---|---|
| 2,925,650 | 2/1960 | Pall | 210/510 |
| 3,567,026 | 3/1971 | Kolm | 210/222 |
| 4,116,829 | 9/1978 | Clark et al. | 210/222 |
| 4,190,524 | 2/1980 | Watson | 210/222 |
| 4,316,798 | 2/1982 | Jepson et al. | 210/222 |

FOREIGN PATENT DOCUMENTS

| | | | |
|---|---|---|---|
| 55-111813 | 8/1980 | Japan | 210/223 |
| 557214 | 4/1943 | United Kingdom | 210/223 |

*Primary Examiner*—Peter A. Hruskoci
*Assistant Examiner*—Sharon T. Cohen
*Attorney, Agent, or Firm*—Kenyon & Kenyon

[57] ABSTRACT

A high gradient magnetic separating device contains a filter structure with a stack of wire screens, arranged closely, one behind the other, of noncorroding ferromagnetic material with a predetermined mesh size and wire thickness. The filter structure is arranged between two parts, forming the magnetic poles, of a ferromagnetic yoke of a magnetic device. The flow direction of the medium to be filtered through the filter structure and the direction of the magnetic field are arranged perpendicular to the wire screens. To prevent turbulence at high flow velocities, which causes inhomogeneous separation, at least on the inlet side of the filter structure, magnetic field carrying elements of ferromagnetic material are connected to the corresponding yoke part and extend up to the filter structure, the elements distributed at least approximately uniformly over the entrance surface of the filter structure, and the total cross-sectional area of the elements occupying approximately between ¼ and ½ of the entrance area.

11 Claims, 5 Drawing Figures

HIGH GRADIENT MAGNETIC SEPARATION DEVICE

BACKGROUND OF THE INVENTION

This invention relates to separating devices in general and more particularly to a device for the separation of magnetizable particles down to particle sizes below 1 μm.

Separation of magnetizable particles down to sizes of 1 μm from a flowing medium using a filter structure arranged in a filter space which is disposed between two parts of a ferromagnetic yoke of a magnetic device forming two magnetic poles in a magnetic field directed substantially parallel or anti-parallel to the flow direction of the medium in the region of the filter structure and which contains several wire screens which are arranged closely one behind the other as seen in the flow direction and at least approximately perpendicular to the flow direction of the medium, using the principle of high gradient magnetic separation technology is described in U.S. application Ser. No. 15,168. The screens are made of non-corroding, ferromagnetic material with predetermined mesh size and wire thickness.

In magnetic separating methods, the fact that, in a suitable magnetic field configuration, a magnetizable particle is subjected to a force which moves it or holds it against other forces attaching it such as, for instance, the force of gravity or, in a liquid medium, against hydrodynamic friction forces is utilized. Such separating methods are provided, for instance, for steam or cooling water loops in conventional as well as nuclear power plants. In the liquid or gaseous medium of these loops, particles which, in general, have been produced by corrosion are suspended. These particles are in part ferromagnetic such as a magnetite ($Fe_3O_4$), partly antiferromagnetic such as hematite ($\alpha$-$Fe_2O_3$) or paramagnetic such as copper oxide (CuO). The magnetizability of these particles, which, in addition, appear in different sizes, is consequently different.

Very small ferromagnetic particles with particle diameters in the order of 1 μm or also weakly magnetic, i.e., antiferromagnetic or paramagnetic particles can be filtered our magnetically with an appreciable degree of separation practically only with separating devices of the so-called high gradient magnetic separation technology (HGM technique) from a flowing medium (see, for instance, "Journal of Magnetism and Magnetic Materials", vol. 13, 1979, pages 1 to 10).

A corresponding HGM separating device is also described U.S. application Ser. No. 15,168. It contains a central filter space with a filter structure of a multiplicity of wire screens arranged closely together in a stack as seen in the flow direction. The screens are arranged perpendicular to the flow direction of the medium in a relatively strong magnetic field. This magnetic field is directed parallel or anti-parallel to the flow direction of the medium in the vicinity of the filter structure and causes there, for instance, a magnetic induction in the order of 1 Tesla. The thickness of the screen wires consisting of ferromagnetic material is very small and is, for instance, less than 0.1 mm. The magnetic field gradients produced at them are then consequently very high so that even weakly magnetizable particles can be filtered out with the separating device.

The central filter space of the known separating device, in which the filter structure of the wire screens is contained, is arranged between the ends of two pole pieces which are part of a yoke body of ferromagnetic material which serves to conduct the magnetic field caused by a magnet coil. The medium to be filtered is conducted either via holes in these pole pieces themselves or through a gap remaining between the pole pieces via ring-shaped chambers and into and out of the filter space. In the case of an axial inlet and outlet of the medium, relatively high flow velocities are obtained, however, in the pole pieces with holes, and inhomogeneous separation at the filter input over the filter cross section. Also with radial flow in and out of the medium, turbulence develops over the filter cross section which leads to uneven separation in the filter structure.

It is therefore an object of the present invention to improve the magnetic separating deviced mentioned at the outset in such a manner that particularly the inflow of the medium containing the particles to be separated into the filter structure is equalized and, at the same time, a reduction of the magnetic induction in the filter structure is prevented.

SUMMARY OF THE INVENTION

According to the present invention, to prevent tubulence at high flow velocities, which causes inhomogeneous separation, at least on the inlet side of the filter structure, magnetic field carrying elements of ferromagnetic material are connected to the corresponding yoke part and extend up to the filter structure, the elements distributed at least approximately uniformly over the entrance surface of the filter structure, with the total cross-sectional area of the elements occupying approximately between ¼ and ½ of the entrance area.

The advantages of the separating device obtained with these measures are in particular that the medium to be filtered enters the structure distributed relatively uniformly over the cross section of the filter structure with not too high a velocity because, at the filter entrance, only relatively short paths between the individual elements carrying the magnetic field are provided. In addition, the magnetic field is advantageously coupled directly to the filter structure by these elements, without relatively long holes through the pole pieces, which can be made only at correspondingly high costs, being necessary.

DETAILED DESCRIPTION

Figure 1:
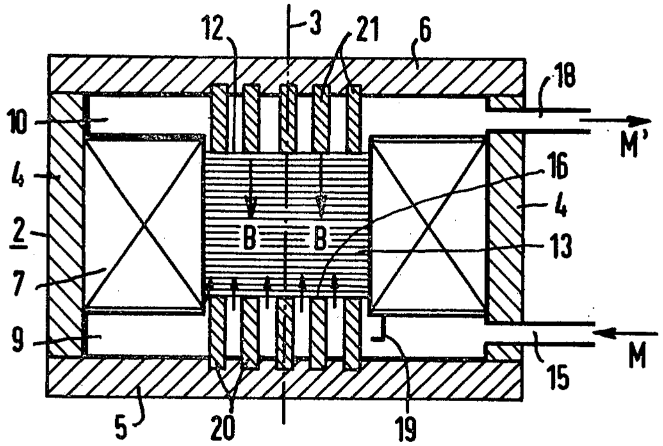
FIG. 1 is a longitudinal section through a separating device according to the present invention.

In FIG. 1, a magnetic separating device using high gradient magnetic separation technology is shown schematically as a longitudinal section. With this device, very small ferromagnetic particles with particle sizes down to less than 1 μm and also weakly magnetic, for instance, paramagnetic or antiferromagnetic particles are to be filtered out from a liquid medium with a relatively high degree of separation. Parts not detailed in the figure of this separating device may, for instance, be corresponding parts of the device described in U.S. application Ser. No. 15,168.

The separating device 2 contains a yoke body of magnetic iron which is rotationally symmetrical with respect to an axis 3 and is assembled from a tubular yoke cylinder 4 and two circular yoke discs 5 and 6 at the end faces. The yoke cylinder encloses a hollow cylindrical magnet coil 7, for instance, a copper solenoid which may optionally be forced cooled. The yoke body made of parts 4 through 6 and the magnet coil 7 therefore form the magnet device of the separating device 2. The magnet coil 7 contained in the interior enclosed by the yoke body extends in the axial direction far enough so that a cylindrical space 9 and 10 of small axial extent is formed between its end faces and the respective yoke plates 5 and 6. The magnet coil 7 produces a magnetic field which extends in a central cylindrical filter space 12 confined thereby at least approximately parallel to the axis 3, between the yoke plates 5 and 6, and the magnetic induction of which in the filter space is illustrated by arrows designated as B.

In the filter space 12, a filter structure 13, not detailed in the figure, is arranged. This filter structure is, in particular, a stack of a multiplicity of screens, so called screen discs, which consist of very fine wires and have a predetermined mesh size. Such a stack contains, for instance, 150 fine screens with a wire thickness of 0.067 mm and a mesh width of 0.14 mm. The screens of this stack facing the circular disc-shaped yoke plates 5 and 6 may be coarser and have, for instance, a wire thickness of 0.3 mm and a mesh width of 0.5 mm. The screens consist of noncorroding ferromagnetic material, for instance, of alloy steel and are arranged perpendicular to the magnetic field directed to parallel to the axis 3 in the region of the filter structure.

For feeding the medium M containing the particles to be separated into the filter structure 13, the space 9 formed between the yoke plate 5 and the magnet coil 7, or the filter space 12, is used as a distribution chamber which is provided with a lateral inlet 15 for the medium M. As indicated in the figure by arrow lines, the medium enters from there into the filter structure 13 from below at its end through the end face 16. In a similar manner, the upper space 10 between the magnet coil and the yoke plate 6 serves as a collecting canal which is provided with a lateral outlet 18 for the filtered medium M'.

In order to assure an approximately uniform inflow of the medium M to be filtered into the filter structure 13, and to avoid, in particular, turbulence, individual column-like elements 20 such as rods of ferromagnetic material are provided between the yoke plate 5 and the filter structure. These elements are, for instance, fastened to the yoke plate 5 and extend in the axial direction directly up to the first screen of the filter structure 13. The magnetic field is advantageously coupled in this manner to the filter structure without interruption. At least the entire cross-sectional area of the magnetic field carrying elements 20 covers about ¼ to ½ of the entrance area 16 of the filter structure and an entrance velocity of the medium M into the filter structure which is not excessively high is assured. Since, furthermore, the elements are distributed at least approximately uniformly over the entrance area 16, a corresponding, largely uniform flow with little turbulence is obtained at the inlet. Clogging of the filter structure on the entrance side is thereby prevented.

As can further be seen from FIG. 1, the outflow side of the separating device 2 may also be provided similarly to the inflow side, with magnetic field carrying elements 21 between the yoke plate 6 and the filter structure 13. Through an appropriate number and arrangement of these elements, turbulence can also be prevented on the outlet side.

As further indicated in FIG. 1, baffles 19 can also be provided, at least on the inlet side, in the distribution chamber 9 on the side facing the inlet 15, which influences the flow conditions. Thus, for instance, a baffle is used to initially force the inflowing medium M, at least on the side facing the inflow 15 to a larger distance from the entrance surface 16 of the filter structure. This permits preventing the medium from flowing relatively much more strongly into the filter structure 13 at points closer to the inlet of the entrance area 16, than at points of the entrance area further away from the inlet. Instead of baffles, screen-like structures may optionally also be provided which, in addition, can also be designed as tubular bodies enclosing the elements 20 at a predetermined distance.

Besides the orientation and design of the magnetic field carrying elements 20 and 21 shown in FIG. 1, other elements extending between the yoke plates 5 or 6 and the filter structure 13 are also suitable for preventing turbulence at the entrance area 16 or the corresponding exit area of the structure. Two embodiments of such elements can be seen in FIGS. 2 and 3. Parts of these which correspond to those in FIG. 1 are provided in these figures with the corresponding reference symbols.

Figure 2:
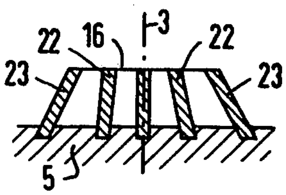
FIG. 2 illustrates a first design of magnetic field carrying elements of the device of FIG. 1.

Thus, according to the schematic longitudinal section of FIG. 2, elements which are oriented at an angle relative to the axis 3 and a central element 20 can also be provided. The elements 23 arranged at a greater distance from this axis may be inclined more than those elements 22 which are nearer. This can bring about a further equalization of the flow of the medium M entering the filter structure.

Figure 3:
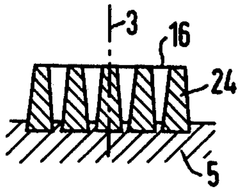
FIG. 3 illustrates a second design of magnetic field carrying elements.

As can be seen, in addition, from the schematic longitudinal section according to FIG. 3, at least the magnetic field carrying elements 24 extending between the yoke plate 5 and the entrance area 16 of the filter structure 13 can have not only a cylindrical shape but, for instance, also the shape of truncated cones.

According to the embodiments of the separating devices of FIGS. 1 to 3, it was assumed that the elements 20 to 24, equalizing the flow, are fastened directly to the yoke plates 5 and 6. For easier assembly of the device it may be advantageous if these elements are held together by a separate mounting plate of ferromagnetic material, this separate plate then being rigidly connected to the respective yoke plate.

Figure 4:
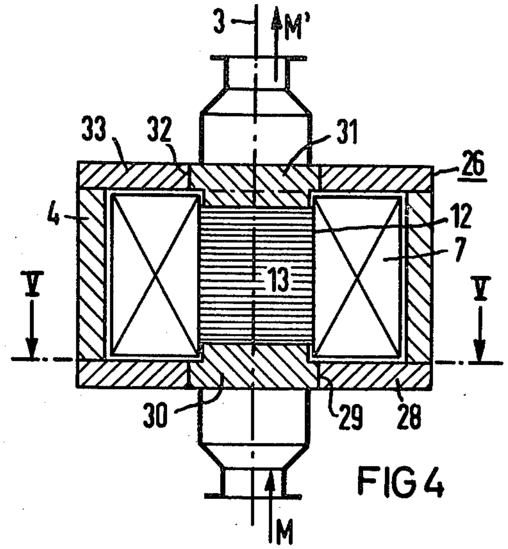
FIG. 4 is a longitudinal section of a further separating device according to the present invention.
Figure 5:
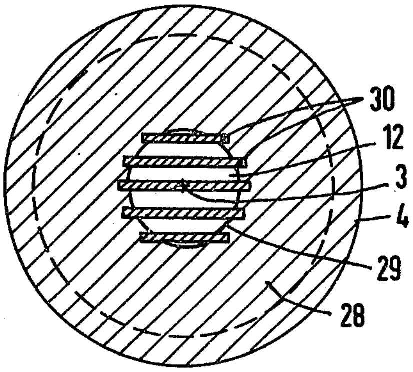
FIG. 5 is a section through the device of FIG. 4.

In FIGS. 4 and 5, a further HGM separating device according to the present invention is schematically illustrated as a longitudinal section and cross section, respectvely. Parts agreeing with FIG. 1 carry the corresponding reference symbols. This device, generally designed as 26 differs from the device 2 according to FIG. 1 essentially in that an axial inlet of the medium M to be filtered and a corresponding outlet of the filtered medium M' are provided. For this purpose, a disc-like yoke plate 28, disposed on the inlet side of a yoke body of ferromagnetic material, contains a central hole 29, the diameter of which is matched to the diameter of a filter space 12, enclosed by a hollow cylindrical magnet coil 7, with a filter structure 13. In the hole 29, individual magnetic field carrying elements 30 of ferromagnetic material are arranged which are connected on the side to the yoke plate 28. These elements can advantageously be mutually parallel iron plates which extend, as seen in the flow direction, directly up to the filter structure 13. Also with such sheets, turbulence in the medium M entering the filter structure 13 can be avoided at least largely, especially at high flow velocities, and thereby, inhomogeneous separation at the filter entrance is prevented. In a similar manner, plates 31 can also be provided in the central hole 32 of a yoke plate 33 on the outlet side.

Instead of the iron plates indicated in FIGS. 4 and 5, perforated plates, fitted into the holes 29 and 32, of ferromagnetic materials can also be used as magnetic field carrying elements 30 and 31. On the sides of the plates facing the filter structure 13, rods according to FIGS. 1 to 3 are fastened.

In addition, the rods 20 to 24 and the plates 30 and 31, on their end faces facing the filter structure can also be provided with distribution canals, especially if these elements have a large cross section. For instance, slots extending parallel to the corresponding inlet or outlet surface of the filter structure can be used as distribution canals in order to further improve the distribution of the medium entering the filter structure and leaving the structure.

What is claimed is:

1. In a device for the separation of magnetizable particles down to particle sizes below 1 $\mu$m, using the principle of high gradiant magnetic separation technology, from a flowing medium, including a filter structure arranged in a filter space which is disposed between two parts of a ferromagnetic yoke of a magnetic device forming two magnetic poles, in a magnetic field which is oriented substantially parallel or antiparallel to the flow direction of the medium in the region of the filter structure, and which filter structure contains several wire screens arranged closely one behind the other as seen in the flow direction, the screens arranged at least approximately perpendicular to the flow direction of the medium and made of noncorroding ferromagnetic material with a predetermined mesh size and wire thickness, an inlet for introducing said flowing medium into said filter structure, and an outlet for removing said flowing medium from said filter structure the improvement comprising magnetic field carrying elements of ferromagnetic material connected to a corresponding yoke part and extending up to the filter structure, at least on the inlet side of filter structure, said elements distributed at least approximately uniformly over the entrance surface of the filter structure, the total cross sectional area of said elements occupying approximately between $\frac{1}{4}$ and $\frac{1}{2}$ of the cross section of the entrance area so as to avoid turbulence in said flowing medium at the entrance point to said filter structure.

2. The improvement according to claim 1, and further including additional magnetic field carrying elements, corresponding to those on the inlet side, on the outlet side of the filter structure.

3. The improvement according to claim 1, wherein said magnetic field carrying elements comprise plates.

4. The improvement according to claim 1, wherein said magnetic field carrying elements comprise rods.

5. The improvement according to claim 4, comprising cylindrical magnetic field carrying elements.

6. The improvement according to claim 4, wherein said magnetic field carrying elements have the shape of truncated cones and have their larger base surface connected to the ferromagnetic yoke part.

7. The improvement according to claim 1 wherein said magnetic field carrying elements are inclined relative to the axis of the magnetic field.

8. The improvement according to claim 7, wherein the inclination of the magnetic field carrying elements relative to the magnetic field axis increases with increasing distance of the elements from this axis.

9. The improvement according to claim 1, wherein said magnetic field carrying elements have slots extending transversely to the flow direction of the medium at their end faces facing the filter structure.

10. The improvement according to claim 1, wherein said device has an axial inlet and outlet for the medium, and wherein the magnetic field carrying elements are held together on their side facing away from the filter structure by means of a plate of ferromagnetic material which is part of the yoke body of the magnetic device, said plate having holes for the passage of the medium.

11. The improvement according to claim 1, wherein said device has a radial inlet and outlet for the medium, and wherein said magnetic field carrying elements are held together on their side facing away from the filter structure by means of a plate of ferromagnetic material which is fastened to the yoke body of the magnetic device.

* * * * *